United States Patent [19]

Bigolin

[11] Patent Number: 5,441,676
[45] Date of Patent: Aug. 15, 1995

[54] METHOD FOR MANUFACTURING INTEGRAL ELASTIC SUPPORTS USING AN EXPANDABLE RESIN

[75] Inventor: Riccardo Bigolin, San Zenone Degli Ezzelini, Italy

[73] Assignee: Selle Royal S.p.A., Pozzoleone, Italy

[21] Appl. No.: 168,211

[22] Filed: Dec. 17, 1993

[30] Foreign Application Priority Data

Oct. 19, 1933 [IT] Italy ................... VI93A0163

[51] Int. Cl.⁶ ........................................... B29C 44/14
[52] U.S. Cl. .................................. 264/25; 264/46.5; 264/46.8; 264/255; 264/278; 264/318; 264/338
[58] Field of Search ............... 264/278, 338, 46.5, 264/46.8, 318, 255, 25

[56] References Cited

U.S. PATENT DOCUMENTS

| | | | |
|---|---|---|---|
| 718,850 | 1/1903 | Kruseman | 297/199 |
| 2,976,577 | 3/1961 | Gould | 264/46.8 |
| 3,020,260 | 2/1962 | Nelson | 5/451 |
| 3,161,436 | 12/1964 | Hood | 264/45.7 |
| 3,187,069 | 6/1965 | Pincus et al. | 264/46.8 |
| 3,487,134 | 12/1969 | Burr | 264/255 |
| 3,548,420 | 12/1970 | Spence | 5/451 |
| 3,663,973 | 5/1972 | Spence | 5/451 |
| 3,773,875 | 11/1973 | Lammers | 264/255 |
| 3,807,793 | 4/1974 | Jacobs | 297/214 |
| 3,943,215 | 3/1976 | Grune et al. | 264/46.8 |
| 4,012,072 | 3/1977 | Hansen | 297/219.11 |
| 4,130,614 | 12/1978 | Saidla | 264/46.5 |
| 4,588,229 | 5/1986 | Jay | 297/452.41 |
| 4,766,025 | 8/1988 | Sanok et al. | 264/255 |
| 4,808,469 | 2/1989 | Hiles | 428/316.6 |
| 4,815,361 | 3/1989 | Chiarella | 5/451 |
| 5,017,114 | 5/1991 | Onnenberg et al. | 264/46.8 |
| 5,037,591 | 8/1991 | Rohrlach et al. | 264/46.8 |
| 5,207,957 | 5/1993 | Heath et al. | 264/46.8 |

FOREIGN PATENT DOCUMENTS

| | | | |
|---|---|---|---|
| 3034973 | 3/1982 | Germany | 264/46.8 |
| 58-029633 | 2/1983 | Japan | 264/46.8 |
| 62-257825 | 11/1987 | Japan | 264/46.8 |

Primary Examiner—Allan R. Kuhns
Attorney, Agent, or Firm—Watson, Cole, Grindle & Watson

[57] ABSTRACT

A method for manufacturing integral elastic supports formed by an upper covering (2), by an intermediate filler (3) and by a semirigid shell (4) entails the use of a mold with a hollow lower part, a flat upper part, and at least one intermediate plate. The method includes the following steps: opening of the mold; deposition on the lower part of a covering sheet with an excess border; securing of the excess border by means of the locking plate; deformation of the covering sheet in vacuum; pouring of a first layer of a gel compound in the fluid state; coupling of a semirigid shell to the upper part of the mold; pouring of a second layer of an expandable resin in the fluid state; closing of the mold; opening of the mold and removal of the finished support. The expandable resin is poured onto the gel compound after a period of time that is sufficient to allow the compound to assume a consistency and shape of its own but is shorter than the full polymerization time so as to allow it to react at least partially with the resin.

27 Claims, 6 Drawing Sheets

METHOD FOR MANUFACTURING INTEGRAL ELASTIC SUPPORTS USING AN EXPANDABLE RESIN

BACKGROUND OF THE INVENTION

1. Field of the invention

The present invention relates to a method for manufacturing integral elastic supports and to an integral support obtained by means of this method.

Typical examples of elastic supports manufactured according to the present invention are the backs and seats for contoured chairs or wheelchairs, for the physically challenged and older people, supports for parts of the bodies of patients forced to long periods of immobility, seats for industrial vehicles, and saddles for bicycles and motorcycles.

2. Description of the Prior Art

It is known that the region of contact between the surface of the support and the part of the human body that must be supported is normally concentrated proximate to the ischial bones of the pelvis. Accordingly, specific pressure is relatively high in these regions and can prevent oxygenation of tissues and correct blood circulation, causing so-called bedsores and other similar disorders. In other cases, as in bicycle saddles used by healthy individuals and athletes, the high specific pressure can create extremely troublesome irritations or affections of the tissues and can, in some cases, temporarily or permanently damage delicate organs, such as the gertitalia and the prostate. On this subject, reference is made to the article published by "Bicycling" magazine of July 1993, pages 57-60. These effects are sometimes increased by the presence of discontinuities or folds on the covering of the support, caused by lack of tension or of adhesion of the covering to the underlying filler.

In order to reduce the specific pressure in the above mentioned delicate regions of the body, supports have been produced that are formed by an outer covering that encloses a padding which includes one or more layers or sacs of materials that are more resilient than the rest of the support. The materials used for this purpose are gaseous, such as compressed gas or air, particularly flexible elastomeric materials, open-cell polyurethane foams, some high-viscosity oily or thixotropic liquids, or combinations of these materials. Examples of these supports are given by French patent No. 2,306,866, by German patent No. 75,799, by European patent No. 0 013 527 and by U.S. Pat. Nos. 718,850, 3,161,436, 4,012,072, 3,807,793, 4,588,229, and 4,808,469.

Supporting structures with elastomeric materials In gel form that behave like liquids but have partial resilience or elastic memory have recently been perfected; reference is made to U.S. Pat. Nos. 3,548,420 and 3,663,973 on this subject.

These known supporting structures generally include a layer of gel material formed by a composition of siloxane or organosiloxane polymers, as disclosed by U.S. Pat. No. 3,020,260. In all these known applications, the gel material has no shape of its own and must therefore be enclosed within impermeable walls or appropriate containers made of flexible material. After being enclosed, the gel can be integrated in a filler made of foamed elastomeric material.

The bicycle saddle structure produced in accordance with U.S. Pat. No. 4,815,361 in the name of Chiarella has a supporting frame made of nylon, polypropylene or other relatively rigid plastic material; a layer of foamed elastomeric material, for example polyurethane foam, obtained separately by molding in a closed mold so that it has a recess that corresponds to the ischial region in its central part is glued onto the frame. The recess is meant to accommodate a sac of organosiloxane gel material, also as disclosed by U.S. Pat. No. 3,020,260. These three parts are mutually superimposed, and a covering of flexible material, for example Lycra or fabric, is applied on them, stretched and anchored to the lower edges of the frame. This saddle and the associated manufacturing method have numerous disadvantages, mainly linked to the use of the particular organosiloxane gel. Since this material does not have a shape of its own, it must in fact, be contained laterally by the lateral edges of the cavity formed on the upper part of the polyurethane foam filler. The filler must therefore be shaped separately arid allowed t,o cure completely in order contain the gel insert downward and laterally. Furthermore, since the silicone gel is unstable, i.e. has a limited shelf life and breaks down easily if it, is subjected to repeated and rather intense stresses, releasing highly impregnating polyhydric alcohols, it must be carefully isolated within a sealed sac made of impermeable material of a certain thickness, for example polyethylene, to avoid leaks or impregnation of the covering. Consequently, the covering cannot be placed directly in contact with the gel compound but must be protected by an intermediate layer that unavoidably reduces the elastic fluid-mechanical properties of the compound. Generally, the saddle manufacturing method according to U.S. Pat. No. 4,815,361 requires an excessive use of labor, with considerable finished-product costs. The method for stretching the support covering layer also does not ensure a uniform supporting surface that is free from creases or discontinuities that reduce the final quality of the finished support and are poorly accepted by users.

The aim of the present invention is to provide an integral elastic support that includes an insert made of gel material that can be obtained by means of an extremely simple and repetitive method, with a very limited use of labor, and can thus be automated substantially completely, so as to considerably reduce production costs and times.

An object is to provide an integral elastic support that includes a gel insert or layer that maximally exploits the hydroelasticity properties of this material.

Another object is to provide a discontinuous process for the mass-production of integral gel supports that are substantially free from discontinuities and surface creases and have a high quality level.

SUMMARY OF THE INVENTION

This aim and these objects are achieved by the method according to the invention, which entails the use of at least one mold that includes a lower part provided with a cavity that is open upward and reproduces the resting surface of the support, a substantially flat upper part that reproduces the bottom of the support, and at least one intermediate plate for retaining the covering, this method comprising the following steps: opening the mold so as to expose the cavity of the lower part of the mold; depositing on the lower part a substantially airtight covering sheet the border of which exceeds the contour of the cavity; securing the excess border against the lower part by superimposing the retention plate on it; permanent forming of the covering sheet by producing vacuum on the internal wall of the cavity; pouring of a first layer of a gel compound in the fluid state onto the bottom of the deformed sheet; detachable coupling of a shell made of semirigid plastic to the upper part of the mold; pouring of a second layer of an expandable resin in the fluid state onto the first gel layer; closing of the mold by superimposing and locking the upper part of the mold on the plate and on the lower part of the mold; keeping the mold in closed condition to allow the foaming and complete polymerization of the resin and of the gel compound; opening of the mold and removal of the finished support; wherein the expandable resin is poured onto the gel compound after a period of time that is sufficient to allow the compound to assume a certain consistency and shape of its own but is shorter than the full polymerization time of the compound, so as to allow it to react at least partially with the expandable resin.

The gel compound and the expandable retain have such compositions as to form, prior to their complete polymerization, chemical bonds at their separation surface.

The separation surface between the gel compound and the expandable resin is constituted by the meniscus of gel compound poured onto the bottom of the deformed covering sheet.

The gel compound consists of a mixture of approximately 20% by weight of a polyurethane matrix having a high relative molecular mass, approximately 80% by weight of a liquid dispersant that includes one or more polyhydric alcohols with hydroxyl groups in higher-than-stoichiometric proportions, with the addition of a catalyst and of possible additives and in the absence of plasticizers. In particular, the gel compound has a composition in accordance with U.S. Pat. No. 4,404,269.

By means of a process according to the invention and by using the above mentioned materials, one obtains an elastic support that is formed by an outer covering made of flexible material superimposed on a polyurethane-foam filler layer which is in turn anchored to a substantially rigid supporting shell, wherein the covering and the filler layer are chemically bonded to each other and to the underlying shell so as to form an integral support. At least, one layer or an insert of polyurethane gel compound, chemically bonded to the upper and lower layers by means of an addition polymerization reaction, is interposed between the covering and the filler layer.

By virtue of the chemical bonds between the various layers and the underlying shell, and by virtue, of the chemical properties of the polymerized compound, it is not necessary to laterally contain the layer of gel, which instead remains coupled to the foamed resin layer at the meniscus of gel compound deposited in the cavity of the mold.

It is thus possible to give the gel layer the most appropriate shapes by forming depressions of the desired shape on the bottom of the lower part of the mold. The gel compound insert thus forms one or more protrusions with respect to the upper surface of the filler which locally reduces pressure on the body of the user with respect to the surrounding regions, where the polyurethane-foam filler layer is more rigid.

Furthermore, since the gel compound is highly stable, the layer of gel can be placed directly in contact with the outer covering, and its elastic and plastic properties are not impaired by containment bodies as in previous supports.

BRIEF DESCRIPTION OF THE DRAWINGS

The invention is described hereinafter by way of non-limitative example by means of a method and a support according to the invention, with reference to the accompanying drawings, wherein.

DESCRIPTION OF A PREFERRED EMBODIMENT OF THE INVENTION

Figure 1:
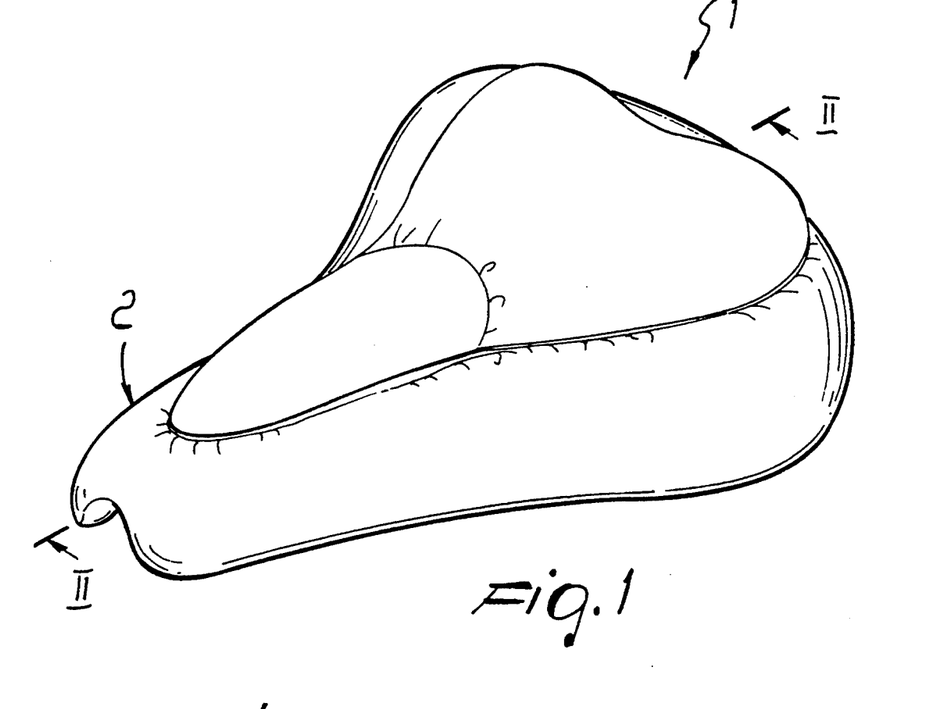
FIG. 1 is a perspective view of a support according to the invention, particularly a bicycle saddle;.
Figure 2:
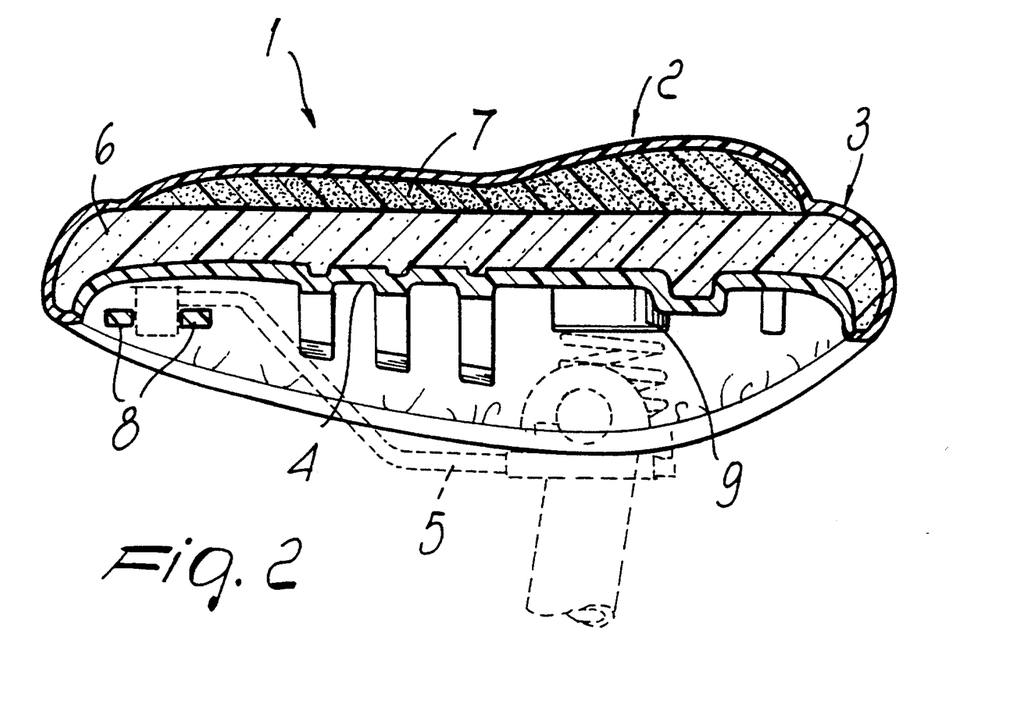
FIG. 2 is a sectional view of the support of FIG. 1, taken along the vertical longitudinal plane II—II.

FIGS. 1 and 2 illustrate an example of an integral support according to the invention, constituted by a bicycle saddle which is particularly comfortable even for prolonged use and is such as to reduce pressure in the pelvic region and the urogenital system.

The saddle 1 includes an upper covering 2 that covers a multilayer elastic filler, generally designated by the reference numeral 3, and a shell 4 made of semirigid plastic material. In particular, the shell is shaped so as to form a stiffened region and a bracket for anchoring to a bicycle frame 5 which is schematically shown in broken lines.

Preferably, the covering can be formed by a multilayer flexible laminar material which includes for example a film of polyurethane material superimposed on a compact base layer of PVC or of PVC-impregnated fabric (Lycra) and on a layer of foamed PVC. The lower surface of the covering is coated with a polyurethane-based primer that contains hydroxyl groups capable of chemically bonding to the filler of the support. The multilayer covering 2 has compactness characteristics combined with a certain softness to the touch and with airtightness to allow its vacuum-forming.

The filler 3 includes a lower layer 6 constituted by a foamed polymeric resin. An upper layer or insert 7, made of a gel compound, is superimposed on the lower layer and chemically bonded to it by addition polymerization reactions. The plan dimensions of the insert are smaller than those of the complete support, and when not in use it protrudes upward with respect to the surface of the lower layer 6. The shape of the insert is such as to form a pad of material that yields hydroelastically at the most delicate parts of the user, namely the pelvic bones and the urogenital system. By virtue of the chemical bond between the two layers 6 and 7 of the filler, the gel compound is self-supporting and does not have to be contained laterally in a preset position. Consequently, the layer 7 can be placed directly in contact with the covering 2, which is in turn chemically bonded both to the gel compound and to the foamed resin.

Advantageously, the gel compound is a polyurethane-based mix in accordance with U.S. Pat. Nos. 4,404,296 and 4,456,642 in the name of the German company Bayer AG, manufactured and marketed by the same company under the trade-name LEVAGEL. In particular, the mix is formed by two main components A and B, where A is constituted by approximately 20% by weight (with respect to the weight of A+B) of a polyurethane matrix having a high relative molecular mass, cross-linked with covalent bonds, and B is approximately 80% by weight (with respect to the weight of A+B) of a liquid dispersant that is closely bonded to the polyurethane matrix by secondary valence forces, with the addition of a catalyst to increase the addition polymerization reactions between the isocyanates and the hydroxyl groups of the two main components and of any additives, such as fibers and dyes. Further details regarding the chemical formula and the process for obtaining this gel compound are included in the above mentioned U.S. patents, the contents of which are included as reference in the present invention. It is interesting to note that the hydroxyl groups contained in component B are present in high stoichiometric excess with respect to the isocyanate groups of compound A, so as to form a urethane polymer dissolved in the polyhydrocalcohol excess which gives the compound a gelatinous but firm appearance. After full polymerization, by virtue of the secondary valence forces between the polyhydric alcohols and the urethane matrix the compound maintains a surprising stability even after prolonged use, with repeated impacts and fatigue stresses. The gel also has a low component migration, so that the polyhydric alcohols dissolved in it do not separate from the urethane matrix, and it therefore does not need to be contained in an impermeable capsule or container as in the case of the silicone gels of the prior art. The gel insert 7 can thus be placed directly in contact with the covering 2 and can fully develop its elastic fluid-mechanics properties.

The lower layer 6 of the filler 3 can be formed by means of a foamed resin produced by addition polymerization reactions of diols and triols with a relative molecular mass of 4500 to 6000 and methylene diisocyanate-based isocyanates (MDI). The polyurethane foam obtained from the reaction between the isocyanate and the water present in the mix has a density of approximately 150-250 kg/m$^3$.

The semirigid shell 4 can be produced by molding or cold injection-molding of polymeric materials such as nylon or polypropylene. Preferably, the surface of the shell in contact with the layer of foamed resin is oxidized by combustion, forming on its surface radicals that can chemically attach to the foamed resin of the filler.

Figure 3:
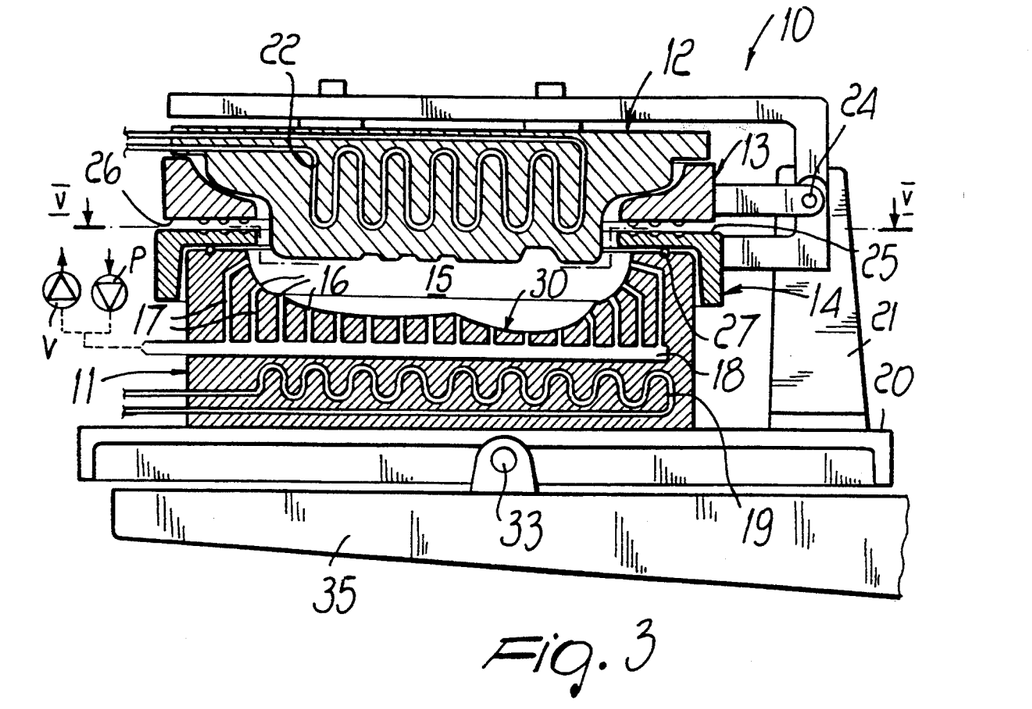
FIG. 3 is a schematic sectional view, taken along a vertical plane, of a mold for performing the method according to the invention, during use.

The method for manufacturing integral saddles with gel insert of the type shown in FIGS. 1 and 2 is schematically shown in FIGS. 6 to 15, and entails the use of a mold 10 illustrated in FIG. 3.

The mold 10 is formed by a lower part 11, by an upper 12, by an intermediate locking plate 13, and preferably by a second undercut plate 14. The lower part 11 can be obtained for example from an aluminum alloy block, on the upper surface of which a cavity 15 is formed; this cavity is open upward and is shaped complementarily to the resting surface of the support which coincides with the outer surface of the covering 2. Holes 16 are present on the bottom of the cavity 15 and are connected, by means of channels 17, to a manifold channel 18 which can in turn be connected, by means of a pipe, to a vacuum pump V or to an external compressor P. The lower part 11 also includes a coil 19 through which a liquid at a temperature between 50° and 80° C. flows in order to keep the lower part of the mold at a temperature of approximately 40° C. throughout the process. The lower part 11 is anchored to a support 20 which carries a bracket 21.

The upper part 12 of the mold can also be obtained from an aluminum plate and is preferably internally provided with a heating coil 22. Its lower face 23 is shaped complementarily to the cavity 15 and to the outer face of the semirigid shell 4 to allow its detachable coupling simply by pressing. The end of the part 12 is hinged at 24 to the bracket 21 so as to rotate upward and expose the cavity The locking plate 13 has a flat lower face 25 that lies peripherally with respect to the cavity 15 with an inner edge that coincides approximately with the upper margin the cavity 15 and is also pivoted to the bracket 21 The plate 14 has an upper face 26 that is similar to the face 25 of the plate 13 but has, with respect to the face 25, an internal border that protrudes inward by a few millimeter-s to form an undercut with respect to the cavity 15. In order to improve the seal between the plate 14 and the lower part, 11 of the mold, a peripheral slot, in which an annular gasket 27 made of elastomeric material is inserted, can be formed on the mold.

Figures 6, 7:
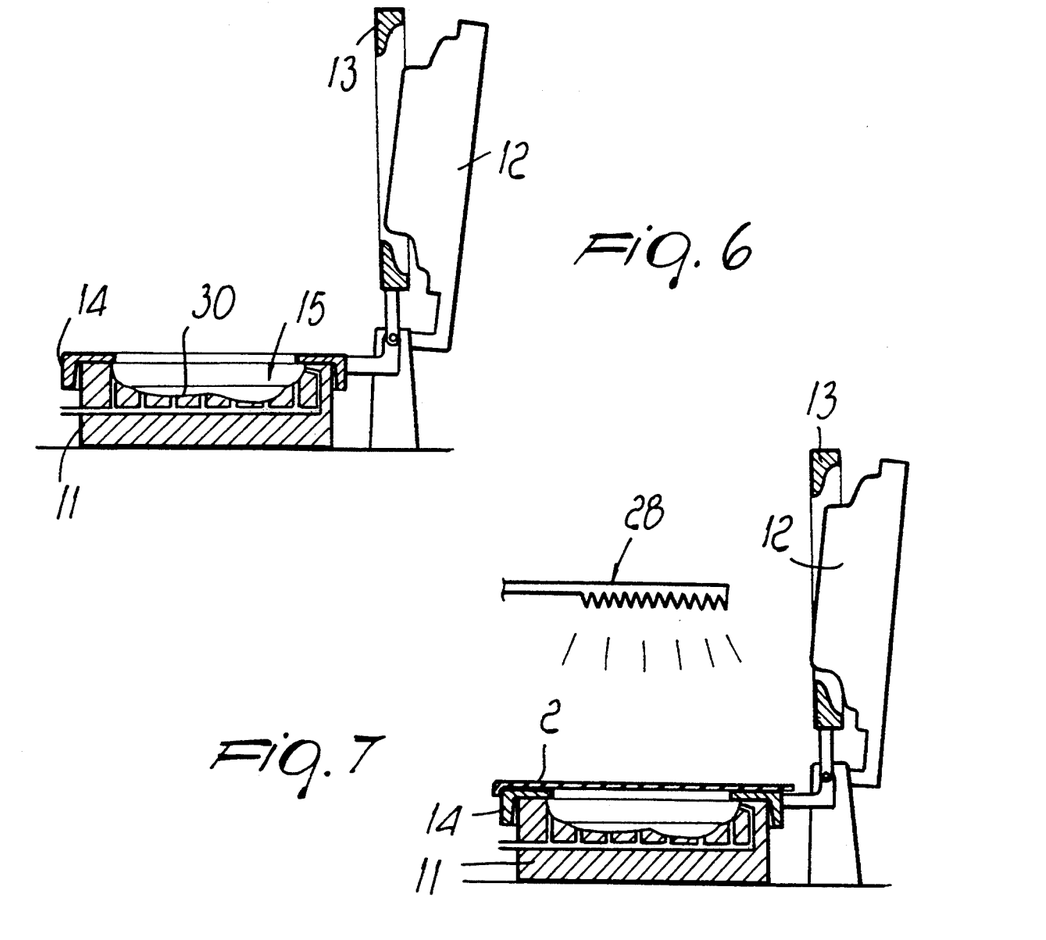
FIGS. 6 to 15 schematically illustrate the various steps of the manufacturing method according to the invention for producing the support of FIG. 1.

The method for manufacturing the support 1 according to the invention includes a first step, shown in FIG. 6, that consists in opening the mold by lifting the upper part 12 and the plate 13 with respect to the lower part 11, either manually or by means of mechanical actuators, allowing the undercut plate 14 to rest on the part The second step entails the laying of a covering sheet 2 on the plate 14 so as to fully cover the cavity 15, with borders that protrude beyond the edge of the plate 14. Immediately after this, the sheet 2 is heated for a few seconds with an UV (ultraviolet) lamp 28 or with a stream of hot air or with infrared rays, so as to raise it to a temperature between 40° and 150° C., preferably between 80° and 100° C., which is close to the plasticization temperature of the base material.

Figure 8:
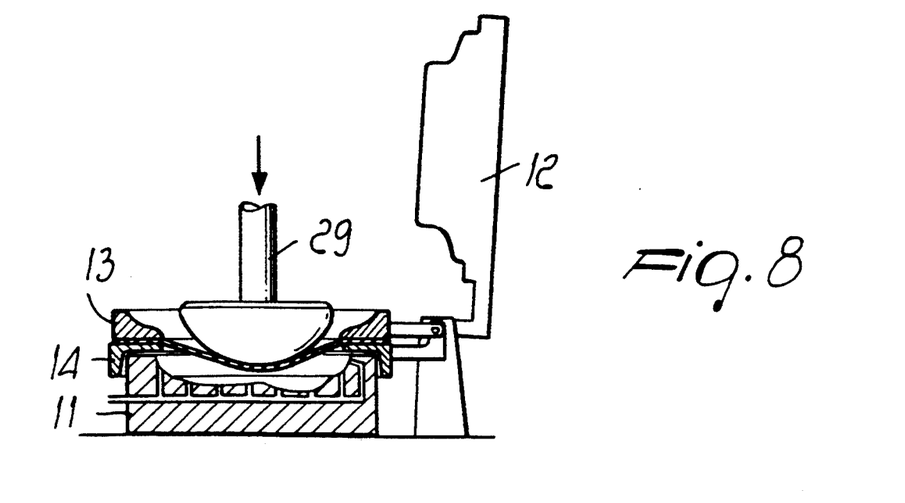
Figure 9:
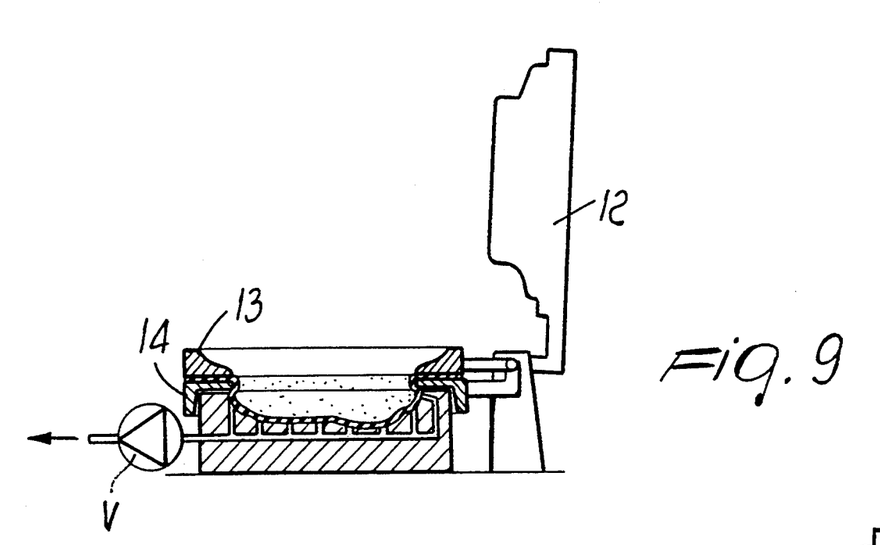
Figure 10:
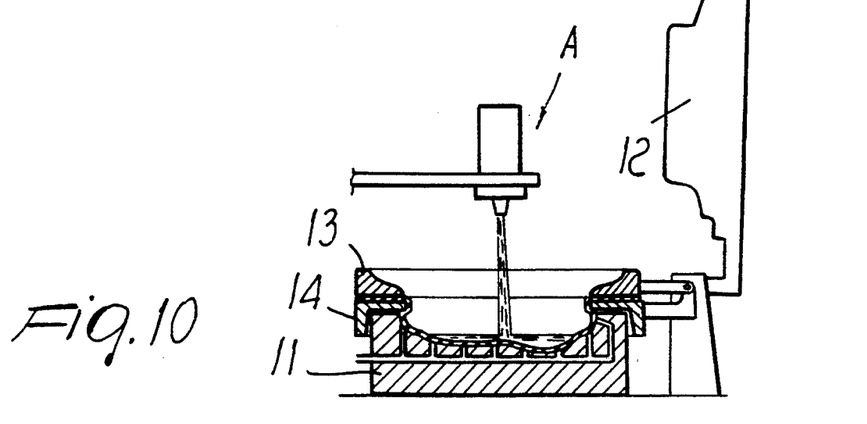

In the subsequent step, shown in FIG. 8, the locking plate 13 is lowered onto the sheet 2, securing its border against the undercut plate 13. Immediately after this, the sheet is preformed by means of a presser 29 so as to stretch it and move it toward the bottom of the cavity 15.

The step shown in FIG. 8 entails the forming of a vacuum on the surface of the cavity 15 so as to make the covering 2 adhere perfectly and deform permanently. Conveniently, a depression 30 is formed on the bottom of the cavity 15 of the mold and is suitable to accommodate a part of the filler 3, forming a corresponding protrusion that extends from the upper surface of the support.

Figure 4:
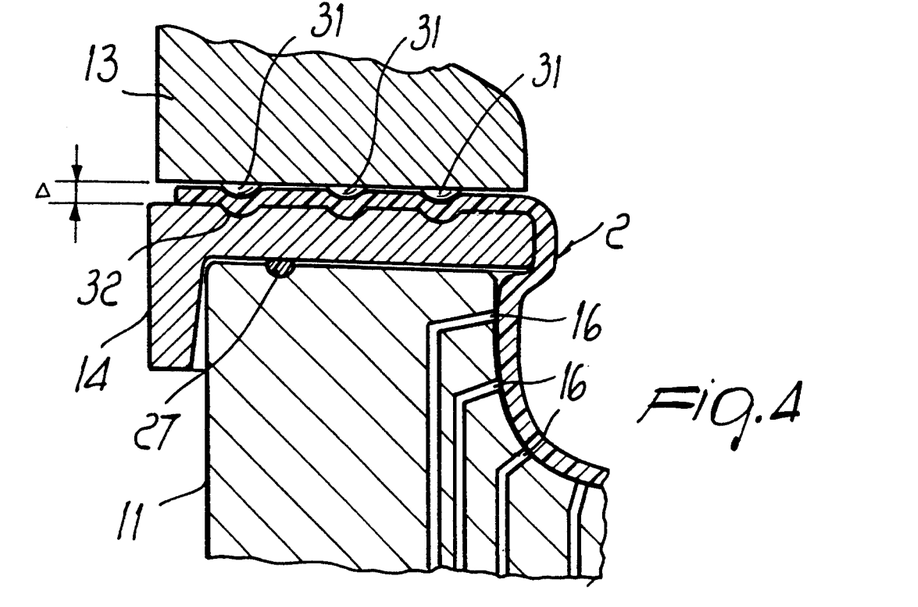
FIG. 4 is an enlarged-scale view of a detail of FIG. 3.
Figure 5:
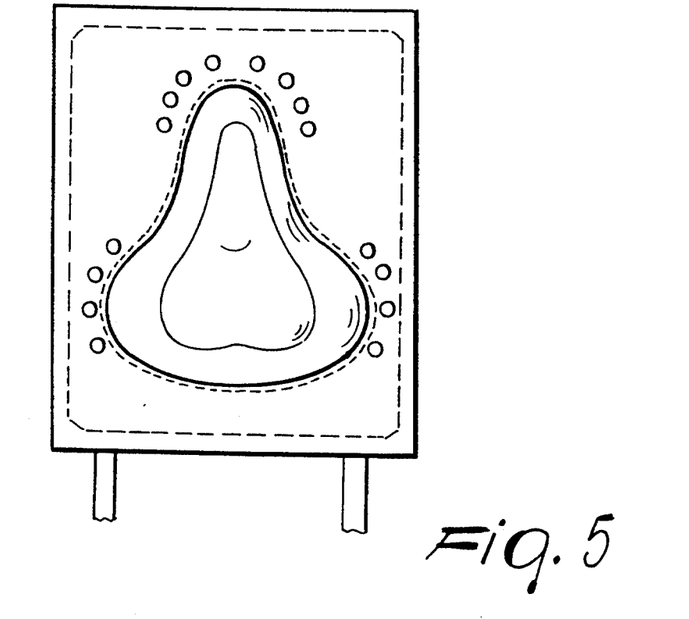
FIG. 5 is a sectional view of the mold of FIG. 3, taken along the plane V—V.

During mechanical and vacuum forming, the border of the sheet 2 is retained along the entire perimeter of the saddle in different manners between the facing surfaces 25 and 26 of the plates 13 and 14 respectively. This is done to firmly secure the border of the covering 2 in the maximum stress regions, allowing instead a limited slip of the material in the remaining regions of the border, in order to avoid the forming of creases and surface discontinuities. For this purpose, the faces 25 and 26 of the plates 13 and 14 are kept so that they face one another along the contour of the cavity 15 with a play Δ which is equal. to the thickness of the covering plus 0.1÷0.15 min. In the regions of maximum stress of the coating, such as the saddle tip and the lateral protrusions, there are additional retention means which are suitable to increase the retaining action by virtue of a larger surface for gripping the material of the covering. As shown in FIGS. 4 and 5, these retention means can be constituted by rounded protrusions 31 that are formed on one of the surfaces 25 and 26, for example on the surface 25, and are arranged opposite to complementarily shaped recesses 32 formed on the opposite face 26. In the specific case, the protrusions 31 and the recesses 32 are located toward the tip and the lateral protrusions of the saddle, where the tighter curvature radii of the outer profile produce the highest stresses during forming.

Figure 11:
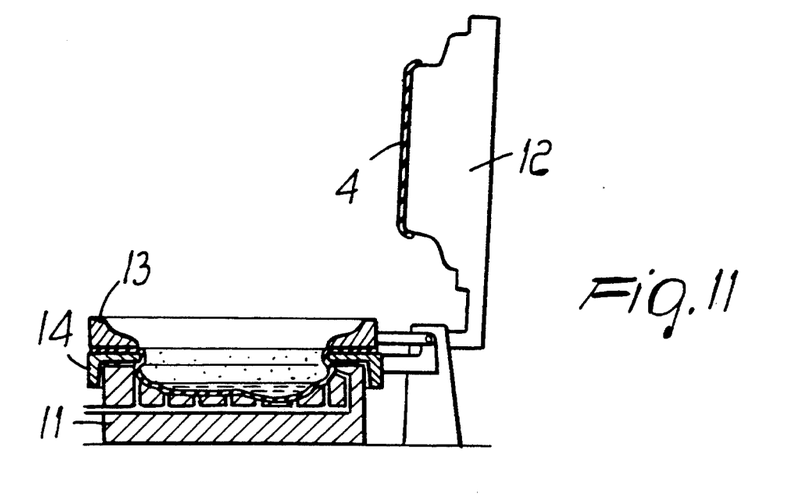

The step of forming the covering 2 is followed by a step which the gel compound is poured onto the bottom of the deformed sheet by means of a first foaming head A, as shown in FIG. 11. Conveniently, the foaming head A deposits the mixed and fluid gel compound at a temperature of approximately 30° C. The pre-polymerized mixture is poured in preset proportions and quantities at the depression 30 of the bottom of the cavity 15 so as to fill it completely. This is followed by a step of initial polymerization of the compound at a constant temperature which is maintained by the coil 19 inserted in the lower part 11 of the mold. According to the invention, the partial polymerization time Tp must be set so as to allow the gel compound to assume a certain consistency and shape of its own, such that not deformed by the subsequent pouring of a second filler layer made of a different material. In particular, the fluid gel compound forms a flat meniscus that forms the separation surface of the compound with respect to an adjacent filler layer.

However, polymerization is only partial, so as to prevent the closing of all the chains of the polymeric compounds of the composition, leaving on the surface of the meniscus several open chains and free radical groups that can bind with the expandable resin that will subsequently be poured.

During the partial polymerization of the gel compound, a shell 4, meant to be integrated in the support as shown in FIG. 11, is coupled to the upper part 12 of the mold.

Figures 12, 13, 14:
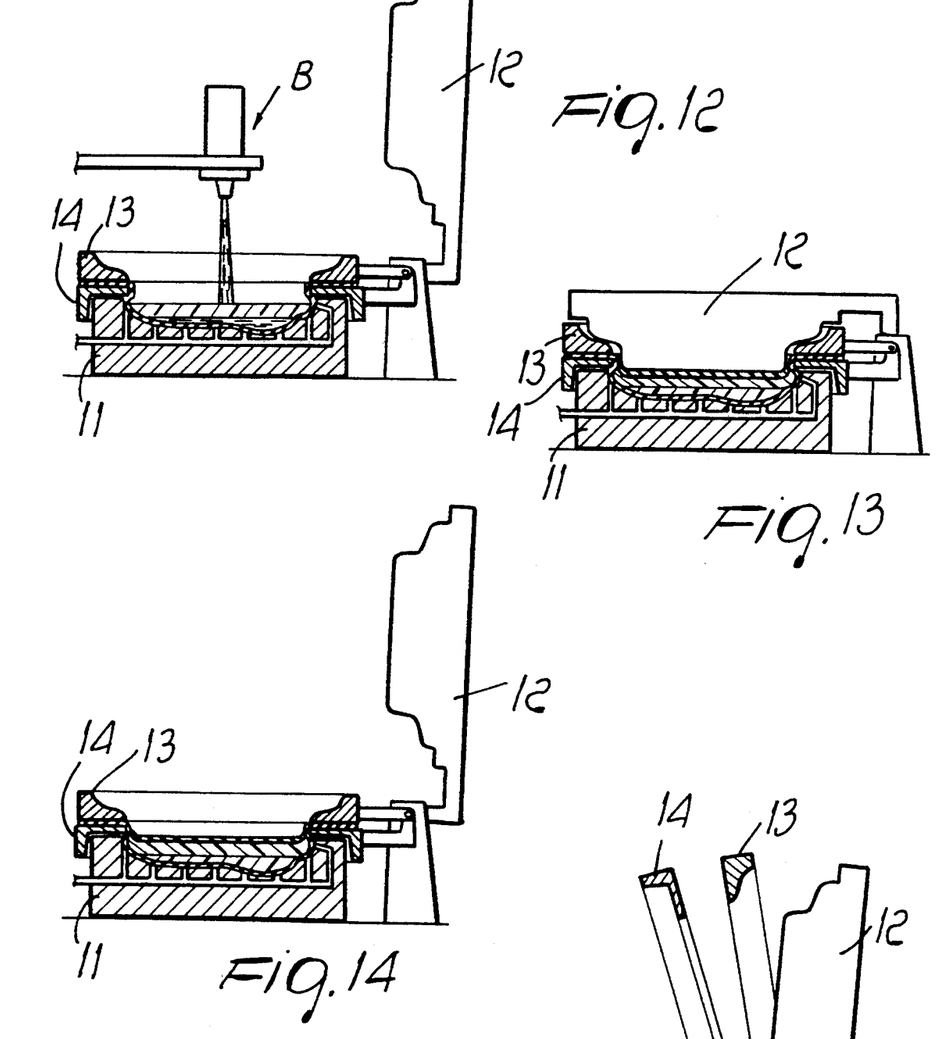

After the partial polymerization time Tp (of 30 to 80 seconds and preferably 50 to 60 seconds) has elapsed, the expandable polyurethane resin is deposited by means of a second foaming head B which is similar to the first one, as shown in FIG. 12.

The mold is then fully closed and sealed, except for some lateral vents, by placing the upper part 12 over the lower part 11 and locking the intermediate plates 13 and 14 against the latter, as shown in FIG. 14. The mold is kept in this condition for a time Tc until the polyurethane resin has fully foamed and cross-linked. At the same time, chemical bonds form between the gel compound and the polyurethane foam at the separation surface of the two materials which coincides with the meniscus of gel compound, and between the gel compound, the polyurethane resin, and the covering 2. In this manner the insert 7 of gel compound is firmly anchored to the layer of foamed polyurethane 6 and the two materials are in turn anchored to the covering 2. The entire assembly is firmly anchored to the shell 4, forming an integral support which is practically finished except for the excess border of the covering sheet 2.

During the full polymerization step the entire mold may be rocked slightly about a substantially horizontal axis 33 to tilt the cavity 15 and facilitate discharge of the gases produced inside the mold by the foaming of the resin, by the exothermic addition-polymerization reactions and by the polymerization of the various components.

Figure 15:
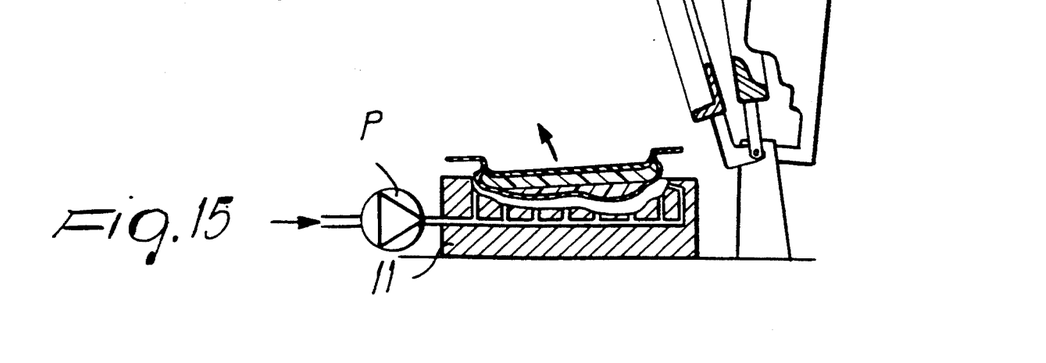

FIG. 15 illustrates the final step of opening of the mold by lifting the upper part 12, the locking plate 13 and the undercut plate 14 to allow extraction of the finished saddle. In order to facilitate expulsion of the support 1, the stream of air in the manifold 18 may be reversed by connecting it to a compressor P and producing a slight overpressure sufficient to separate the support from the bottom of the cavity 15.

In order to completely finish the support it is sufficient to remove the excess material of the covering sheet by means of a continuous cutter.

Figure 16:
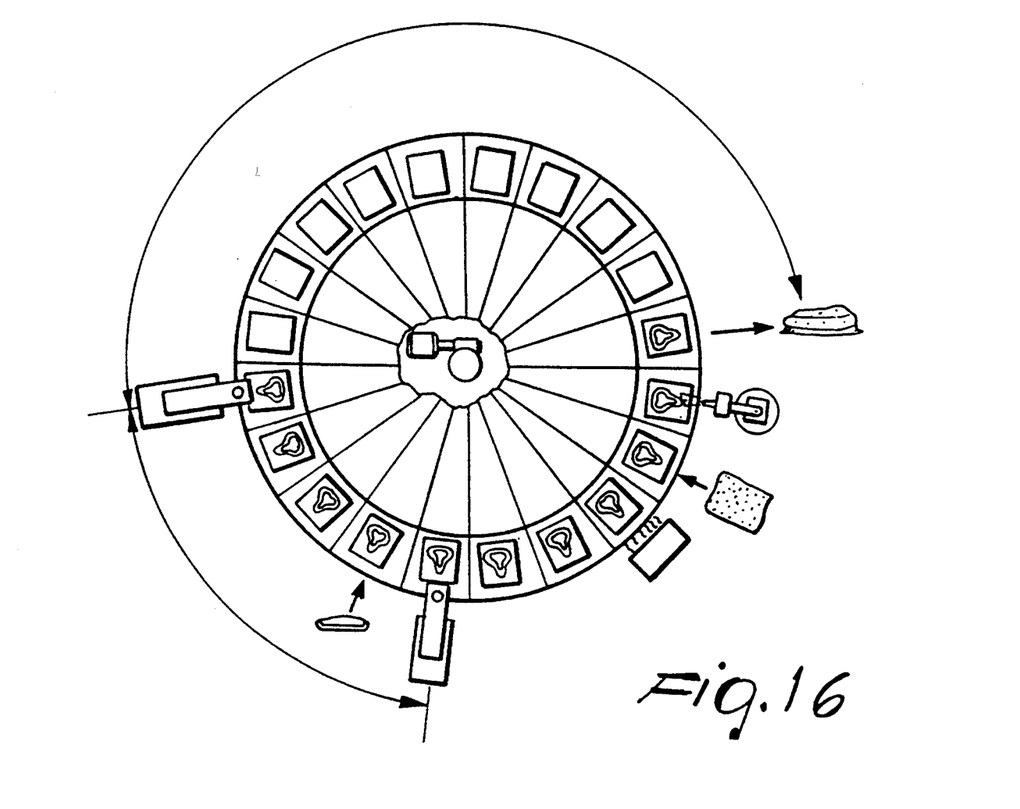
FIG. 16 is a schematic top view of an apparatus for manufacturing according to the invention shown in FIGS. 6 to 15.

FIG. 16 is a top view of an apparatus that uses a series of molds of the type shown in FIG. 3 and uses the above described method in a semi-continuous manner. The apparatus includes a turntable 34 that is divided into a certain number of sectors 35 that form the bases for the supports 20 of the molds 10. The turntable is rotated by means of a gearmotor 36 in steps which have an angular extent equal to that of the sectors in order to place the molds in front respective stations. The UV-ray lamp 28 and the foaming heads A and B are arranged along the perimeter of the turntable 34; the heads can move radially to place themselves on the depression 30 of the cavity 15. The covering sheet 2 and the shell 4 are inserted manually or by means of mechanical manipulators. The various stations are angularly spaced so as to produce the sequence shown in FIGS. 6 to 15.

With respect to this sequence it is possible to add a step in which a non-stick releasing product is sprayed along the border of the surface 23 of the upper part 12 of the mold to prevent the polyurethane foam from sticking to the mold. This step, added after the mold opening step shown in FIG. 6, can be produced by means of an apropriate automatic spray head 37. Actuation of the various parts and rotation of the turntable are controlled by a PLC-type control unit possibly connected to a PC capable of displaying the main parameters of the process.

Although the method and the support according to the invention have been described in a preferred embodiment, it is evident that they are susceptible to numerous modifications and variations, all of which are within the scope of the inventive concept expressed in the accompanying claims. For example, the manufacturing apparatus illustrated in FIG. 16 can use a closed-loop conveyor belt instead of a turntable without abandoning the scope of the invention.

I claim:

1. A method for manufacturing an integral elastic support formed by an upper covering, by an intermediate filler and by a lower semirigid shell, employing a mold formed of a lower part having an upwardly open cavity and reproducing the resting surface of the support, a substantially flat upper part reproducing the bottom of the support, and a first locking plate intermediate the upper part and the lower part for engaging and retaining the covering, said method comprising the steps of:

a) opening the mold so as to expose the cavity of the lower part of the mold;

b) depositing on said lower part a substantially airtight covering sheet having an excess border which exceeds the contour of said cavity;

c) securing said excess border against said lower part by superimposing said first locking plate thereon with the excess border located therebetween;

d) vacuum forming the covering sheet to produce a deformed sheet by producing a vacuum on an internal wall of said cavity;

e) pouring a first layer of a gel compound in a fluid state onto the bottom of the deformed sheet;

f) detachably coupling a shell made of semirigid plastic to the upper part of the mold;

g) pouring a second layer of an expandable resin in the fluid state onto said first gel layer;

h) closing the mold by superimposing and locking the upper part of the mold on said first locking plate and on said lower part of the mold;

i) maintaining the mold in such closed condition to allow the foaming and complete polymerization of the resin and of the gel compound; and k) opening the mold and removing the finished support;

wherein the expandable resin is poured onto the gel compound after a period of time that is sufficient to allow the gel compound to assume a certain consistency and shape of its own but which is shorter than the full polymerization time of the compound, so as to allow the gel compound to react at least partially with said expandable resin.

2. A method according to claim 1, wherein said gel compound and said resin have a separation surface therebetween and form, prior to their complete polymerization, chemical covalent bonds at said separation surface.

3. A method according to claim 2, wherein the separation surface between said gel compound and said resin comprises a free surface of the gel compound poured onto the bottom of the deformed covering sheet.

4. A method according to claim 3, wherein said gel comprises a mixture of approximately 20% by weight of a polyurethane matrix with high relative molecular mass with approximately 80% by weight of a liquid dispersant that comprises one or more polyhydric alcohols with hydroxyl groups in higher-than-stoichiometric proportions, with the addition of a catalyst.

5. A method according to claim 4, wherein said expandable resin is a foaming polyurethane compound that can be obtained by means of the mixing and addition polymerization reaction of one or more polyhydric alcohols with one or more polyisocyanates.

6. A method according to claim 1, wherein said time elapsing between the end of the pouring of the gel compound and the beginning of the pouring of the expandable resin is in a range of about 30 and about 80 seconds.

7. A method according to claim 6, wherein said gel compound is poured into the lower part of the mold at an initial temperature in a range of about 30° and about 40° C.

8. A method according to claim 7, wherein polymerization and reaction of the gel compound and of the expandable resin while the mold is closed occurs at a controlled and substantially constant temperature in a range of about 40° and about 80° C. by appropriate heating of the upper and lower parts of the mold.

9. A method according to claim 1, wherein the gel compound is poured onto the deformed covering sheet at one or more depressions formed on the bottom of the lower part of the mold, said depressions being meant to form, in the finished support, corresponding protrusions in the regions of specific maximum pressure for the body of the user.

10. A method according to claim 1, further comprising the step of interposing a second plate between the upper part and the lower part of the mold, said second plate being formed with an internal border profiled like the contour of the cavity of said lower part, and being undercut in order to fold the covering sheet slightly inward.

11. A method according to claim 10, wherein the average play between the locking plate and the second plate, during the covering sheet forming step d), is equal to the thickness of the sheet plus an amount in a range of about 0.1 and about 0.15 mm to retain the excess edge of said sheet, allowing its partial sliding to avoid the forming of creases.

12. A method according to claim 10, wherein the average play between the locking plate and the second plate, during the covering sheet forming step d), is equal to the thickness of the sheet plus an amount in a range of about 0.1 and about 0.15 mm to retain the excess edge of said sheet, allowing its partial sliding to avoid the forming of creases, said locking plate and said undercut plate having, along mutually facing regions, retention means in order to locally apply a stronger securing action to the borders of the sheet at regions that are particularly stressed by deformation.

13. A method according to claim 10, wherein the average play between the locking plate and the second plate, during the covering sheet forming step d), is equal to the thickness of the sheet plus an amount in a range of about 0.1 and about 0.15 mm to retain the excess edge of said sheet, allowing its partial sliding to avoid the forming of creases, said locking plate and said second plate having, along mutually facing regions, retention means in order to locally apply a stronger securing action to the borders of the sheet at regions that are particularly stressed be deformation, said retention means comprising at least one rounded protrusion formed on the surface of one of the edges and being suitable to cooperate with an oppositely arranged and complementarily shaped recess formed on the other one of said edges to increase the retention surface with respect to the covering sheet.

14. A method according to claim 10, wherein the average play between the locking plate and the second plate, during the covering sheet forming step d), is equal to the thickness of the sheet plus an amount in a range of about 0.1 and about 0.15 mm to retain the excess edge of said sheet, allowing its partial sliding to avoid the forming of creases, said locking plate and said second plate having, along mutually facing regions, retention means in order to locally apply a stronger securing action to the borders of the sheet at regions that are particularly stressed by deformation, said retention means including at least one rounded protrusion formed on the surface of one of the edges and being suitable to cooperate with an oppositely arranged and complementarily shaped recess formed on the other one of said edges to increase the retention surface with respect to the covering sheet, prior to the vacuum forming step d), being subjected to a step 1) of uniform preheating at a temperature in a range of about 50° and about 120° C.

15. A method according to claim 1, further including the step of depositing a releasing product along the border of the shell and of the upper part of the mold, in order to avoid adhesion of the expandable resin in these regions, prior to the step b) in which the covering sheet is placed on the lower part of the mold.

16. A method according to claim 1, further comprising the step of tilting the mold with respect to a horizontal plane to facilitate discharge of gases generated therein during the foaming and cross-linking of the resin and its reaction with the gel compound.

17. Method according to claim 1, wherein the covering sheet has, on its inner face, at least one layer of a polymer that can bond chemically to the gel compound and to the expandable resin.

18. A method according to claim 1, further comprising the step of overpressurizing the inner surface of said lower part in order to facilitate extraction of the finished support.

19. A method according to claim 1, wherein multiple molds are mounted on respective consecutive processing units, said units being jogged synchronously with respect to a first stationary foaming head A for the pouring of a gel compound, followed by a second stationary foaming head B for the pouring of an expandable resin, the advancement rate of said units and the pouring times of said foaming heads being adjusted so as to achieve the partial polymerization of said gel compound inside each individual mold so as to give it a consistency and shape of its own prior to the pouring of said expandable resin but such as to allow the forming of chemical bonds between said gel compound and said expandable resin.

20. A method according to claim 19, wherein said consecutive units are mounted on a turntable that rotates in steps about a substantially vertical axis.

21. A method according to claim 19, wherein said consecutive units are mounted on a closed-loop continuous conveyor belt that moves in steps in a preset direction.

22. A method according to claim 1, wherein the elapsed time between the end of the pouring of the gel compound and beginning of the pouring of the expandable resin is greater than about 50 seconds.

23. A method according to claim 8, comprising the step of heating the upper and lower parts by separate thermal circuits.

24. A method according to claim 10, wherein the second plate is undercut by at least by two millimeters.

25. A method according to claim 14, further including the step of mechanically preforming the covering sheet by pressing.

26. A method according to claim 14 wherein the preheating step occurs as a result of at least one of irradiation and convection.

27. A method according to claim 3 wherein the gel compound comprises a mixture of about 20% by weight of a polyurethane matrix with high relative molecular mass and approximately 80% by weight of a liquid dispersant comprising a polyhydric alcohol and said mixture being formed without plasticizers.

* * * * *